(12) United States Patent
Brown et al.

(10) Patent No.: US 6,378,644 B1
(45) Date of Patent: Apr. 30, 2002

(54) MOTORCYCLE SWING ARM SUPPORT ASSEMBLY

(75) Inventors: William H. Brown, Menomonee Falls; Brad R. Hadfield, Port Washington, both of WI (US)

(73) Assignee: Harley-Davidson Motorcycle Company Group, Inc., Milwaukee, WI (US)

(*) Notice: Subject to any disclaimer, the term of this patent is extended or adjusted under 35 U.S.C. 154(b) by 0 days.

(21) Appl. No.: 09/363,403

(22) Filed: Jul. 29, 1999

(51) Int. Cl.[7] .............................................. B62K 25/12
(52) U.S. Cl. ..................................... 180/227; 280/284
(58) Field of Search ................................ 180/312, 374, 180/228, 230, 219, 299, 294, 298, 227; 280/284, 285

(56) References Cited

U.S. PATENT DOCUMENTS

| | | | | |
|---|---|---|---|---|
| 4,671,375 A | * | 6/1987 | Oike et al. ................... | 180/227 |
| 5,265,335 A | * | 11/1993 | Kawagoe et al. ....... | 29/898.058 |
| 5,274,921 A | * | 1/1994 | Kawagoe et al. ....... | 29/898.059 |
| 5,390,758 A | * | 2/1995 | Hunter et al. ................ | 180/228 |
| 5,469,930 A | * | 11/1995 | Wiers .......................... | 180/227 |
| 5,487,443 A | * | 1/1996 | Thurm ........................ | 180/227 |
| 5,749,591 A | * | 5/1998 | Thurm ........................ | 280/284 |
| 5,785,141 A | * | 7/1998 | Breitkreutz et al. ......... | 180/219 |
| 5,996,718 A | * | 12/1999 | Desrosiers ................... | 180/227 |
| 6,024,185 A | * | 2/2000 | Okada et al. ............... | 180/227 |
| 6,131,684 A | * | 10/2000 | Ticknovich ................. | 180/227 |

* cited by examiner

Primary Examiner—Robert P. Olszewski
Assistant Examiner—Andrew J. Fischer
(74) Attorney, Agent, or Firm—Michael Best & Friedrich LLP

(57) ABSTRACT

A motorcycle swing arm support assembly includes a bushing extending through a portion of the swing arm and the frame, a spacer, and a bolt extending through the frame, swing arm, bushing, spacer, and a portion of the motorcycle transmission case. The drive belt of the motorcycle defines a loop around the spacer. The drive belt may be removed without dropping or raising the transmission case by partially retracting the bolt so that the spacer may be removed and the belt replaced. The bushing has an elongated portion that may be extended through the swing arm and the frame to pivotally connect the frame and swing arm during the assembly process.

5 Claims, 5 Drawing Sheets

MOTORCYCLE SWING ARM SUPPORT ASSEMBLY

FIELD OF THE INVENTION

The invention relates to a swing arm support assembly for a motorcycle and a method for assembling a motorcycle having such a swing arm support assembly.

BACKGROUND

It is known to mount a transmission case to a swing arm and frame with a single elongated bolt member. In the past, the motorcycle drive belt has defined a loop around the elongated bolt member. In such prior art assemblies, the elongated bolt member had to be removed entirely from the transmission case to drop the transmission case and provide clearance for removal and replacement of the drive belt.

In the past, motorcycles have been manufactured by holding the swing arm in position while the transmission case is mounted to the swing arm and the motorcycle frame. The swing arm has typically been held in place by an outside force, such as manually or with a machine, until the bolt member can be inserted through the swing arm, frame, and transmission case.

SUMMARY

The present invention provides a motorcycle having a frame, swing arm, a transmission case, an elongated pivot member pivotally mounting the swing arm and transmission case to the frame, a removable spacer disposed on the elongated pivot member, and a drive member defining a closed loop about the elongated pivot member. Preferably, the spacer is disposed between a pivot mounting portion of the frame and the transmission case. The spacer may be disposed within the closed loop defined by the drive member.

The invention also provides a method for removing a drive member from a motorcycle. The method includes the steps of removing a spacer and removing the drive belt while maintaining the transmission case substantially in the operating position. The method may include partially removing a pivot member that supports the transmission case and the spacer, and then removing the spacer from the pivot member. The method may include removing the spacer from between the transmission case and the frame prior to removing the drive member.

The invention also provides a method for assembling a motorcycle having a frame and a swing arm. The method includes aligning the swing arm with the frame, inserting a bushing through both the swing arm and the frame to pivotally connect the swing arm to the frame, and inserting an elongated pivot member through the bushing. Preferably, the bushing includes an elongated portion, and the method includes extending the elongated portion through a portion of the swing arm and the frame. The method may also include positioning a portion of the swing arm adjacent an inwardly-facing surface of the frame and extending the bushing through the swing arm and then through the frame.

Other features and advantages of the invention will become apparent to those skilled in the art upon review of the following detailed description, claims, and drawings.

Figure 1:
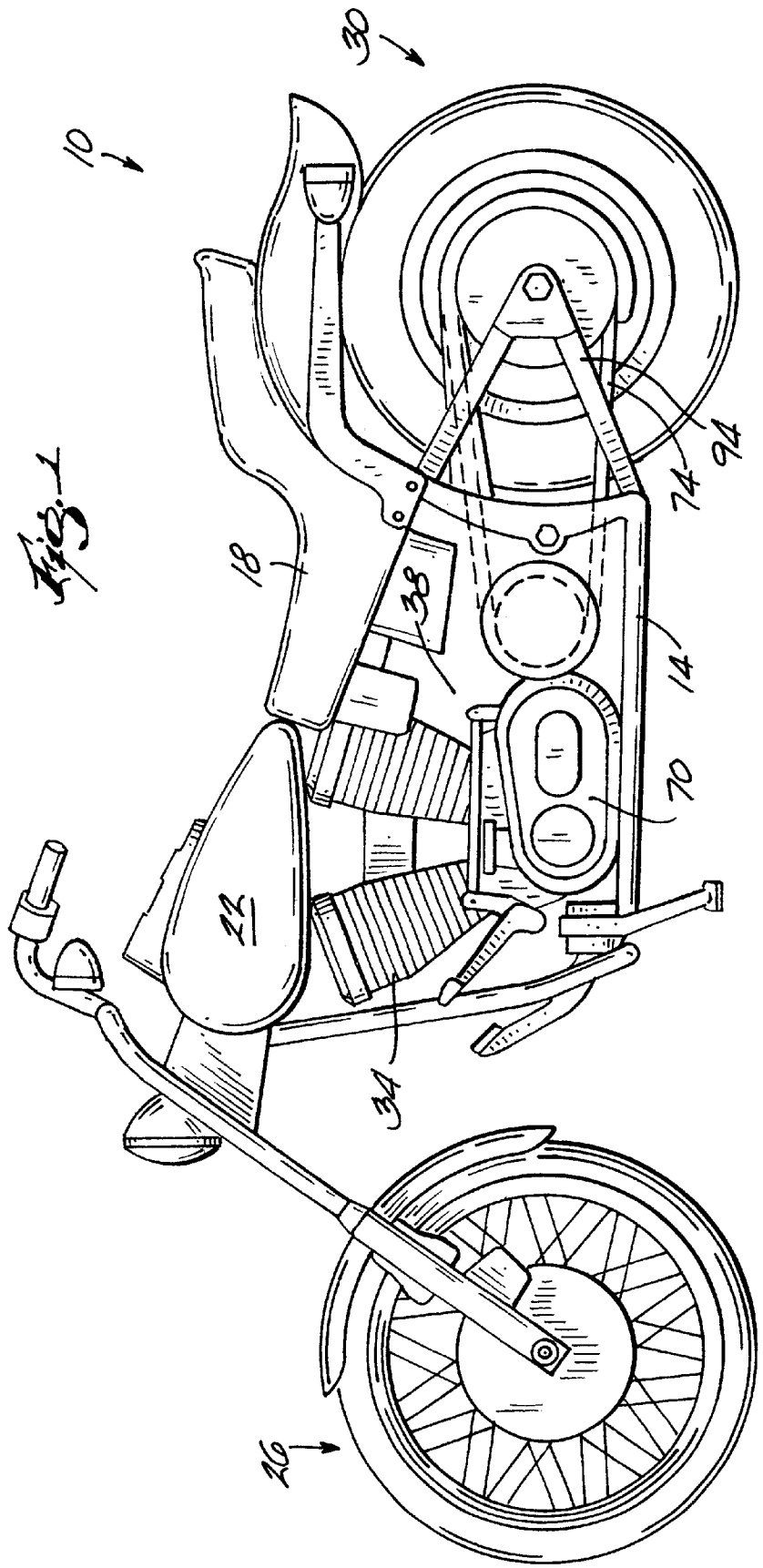
FIG. 1 is a left side elevational view of a motorcycle embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify steps of a method or process is simply for identification and is not meant to indicate that the steps should be performed in a particular order.

DETAILED DESCRIPTION

FIG. 1 illustrates a motorcycle 10 including a frame 14. Mounted to the frame 14 are a seat 18, a fuel tank 22, front and rear wheel assemblies 26, 30, an engine 34, and a transmission case 38. The illustrated engine 34 is V-type two-cylinder four-stroke engine including first and second cylinders. The invention may, however, be embodied in a motorcycle having a non-V-type engine, or an engine with one cylinder or more than two cylinders.

Figure 2:
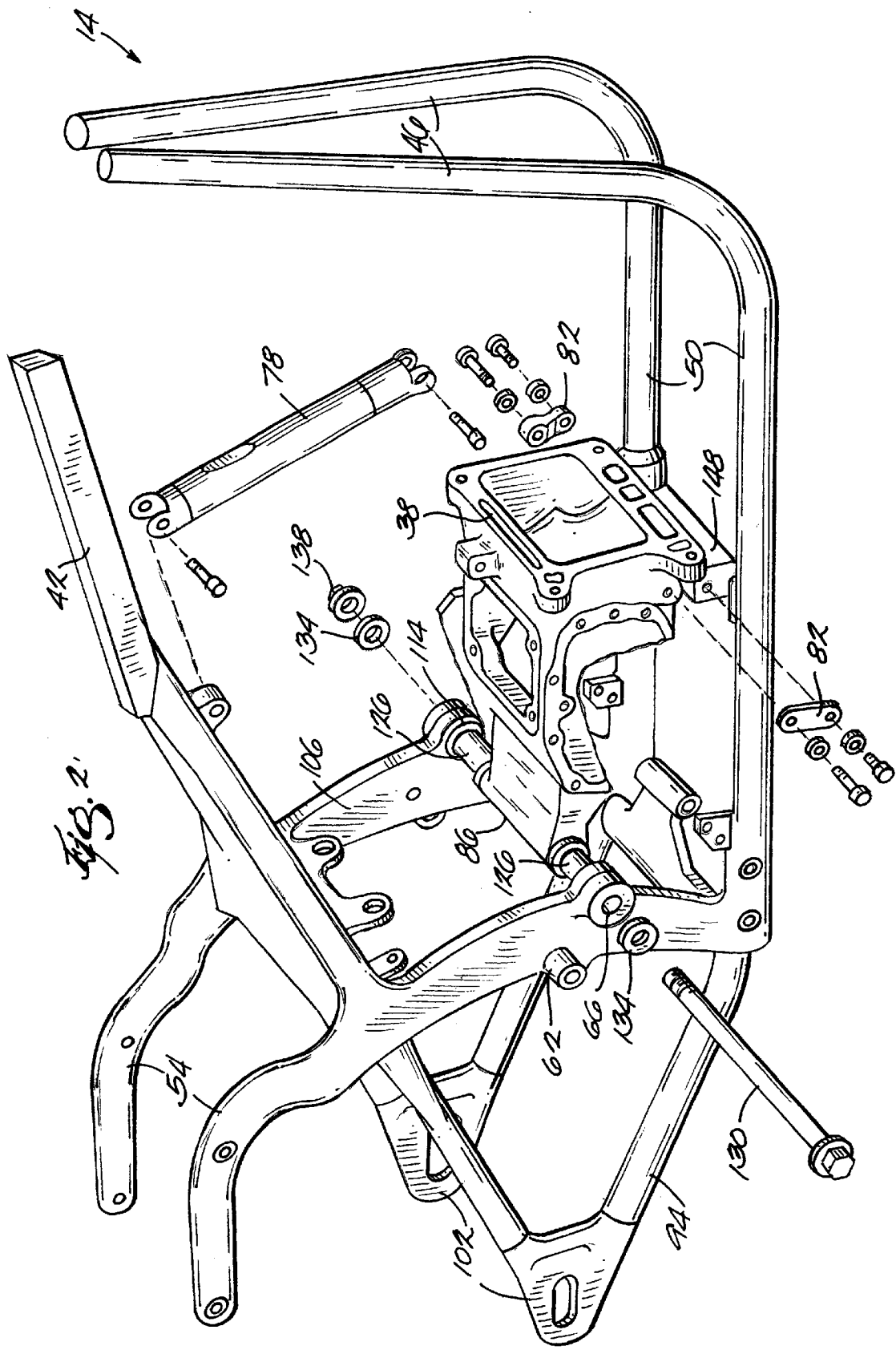
FIG. 2 is an exploded perspective view of a rear portion of the motorcycle with some components removed or partially broken away for the purpose of illustration.

FIG. 2 better illustrates the motorcycle frame 14. The frame 14 includes a backbone portion 42, a pair of front members 46, a pair of lower members 50 that are substantially parallel to each other, and a pair of rear portions 54 that include a pair of pivot mounting portions 62 having generally horizontal, axially-aligned bores 66 extending therethrough.

Referring again to FIG. 1, the transmission case 38 includes the transmission of the motorcycle 10. An engine crankshaft (not shown) drives the transmission main shaft (not shown). The crankshaft and main shaft are concealed by a cover 70. The transmission also includes an output shaft that drives the rear wheel 30 through a belt or other drive member 74 (also shown in FIG. 5). Although the illustrated motorcycle 10 includes a left-side-only drive system, the invention may be modified to be embodied in motorcycles having other types of drive systems, such as right-side or chain drive systems.

Figure 4:
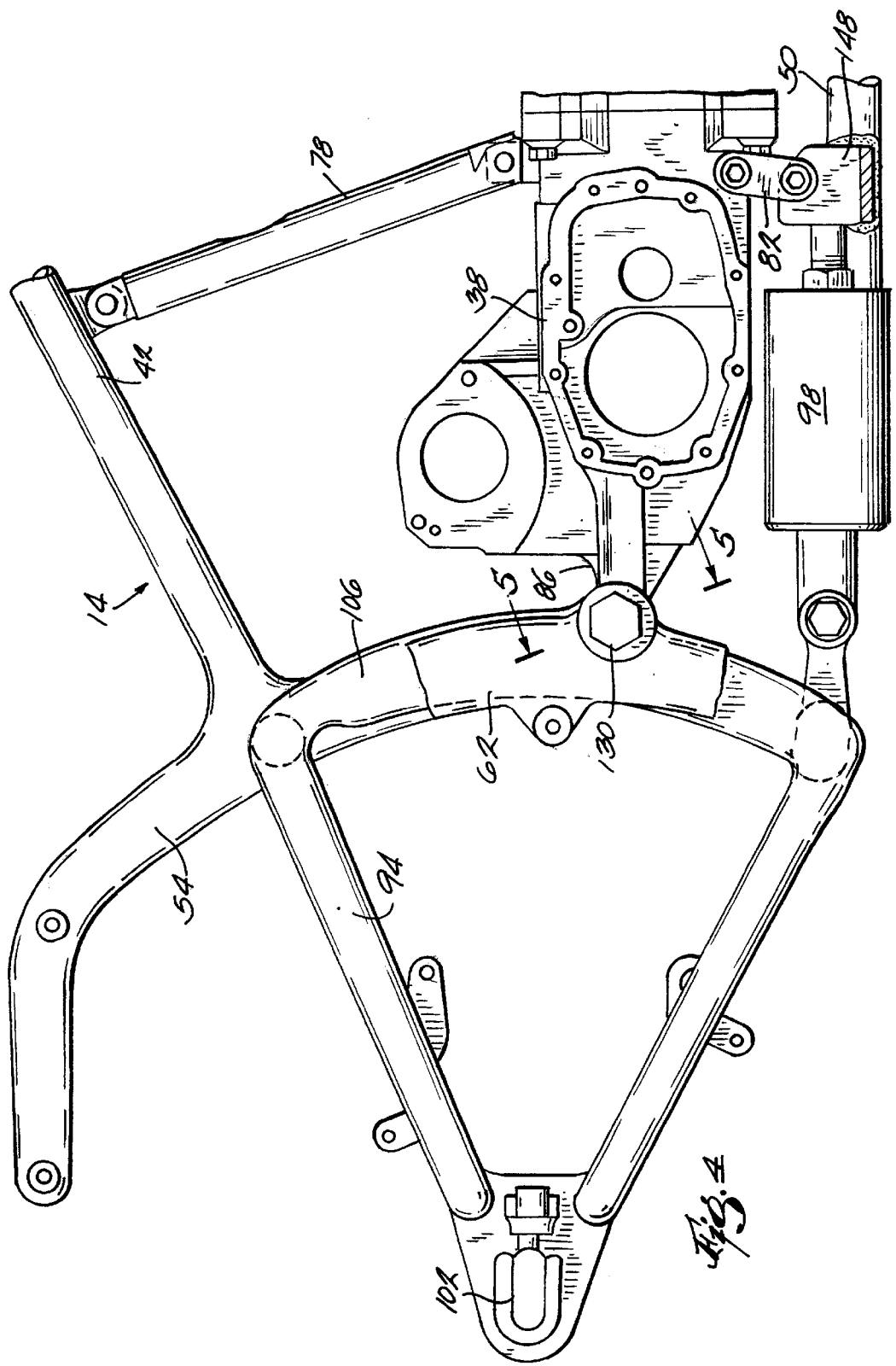
FIG. 4 is a right side elevational view of the rear portion of the motorcycle with some components removed and a portion of the frame broken away for the purpose of illustration.
Figure 5:
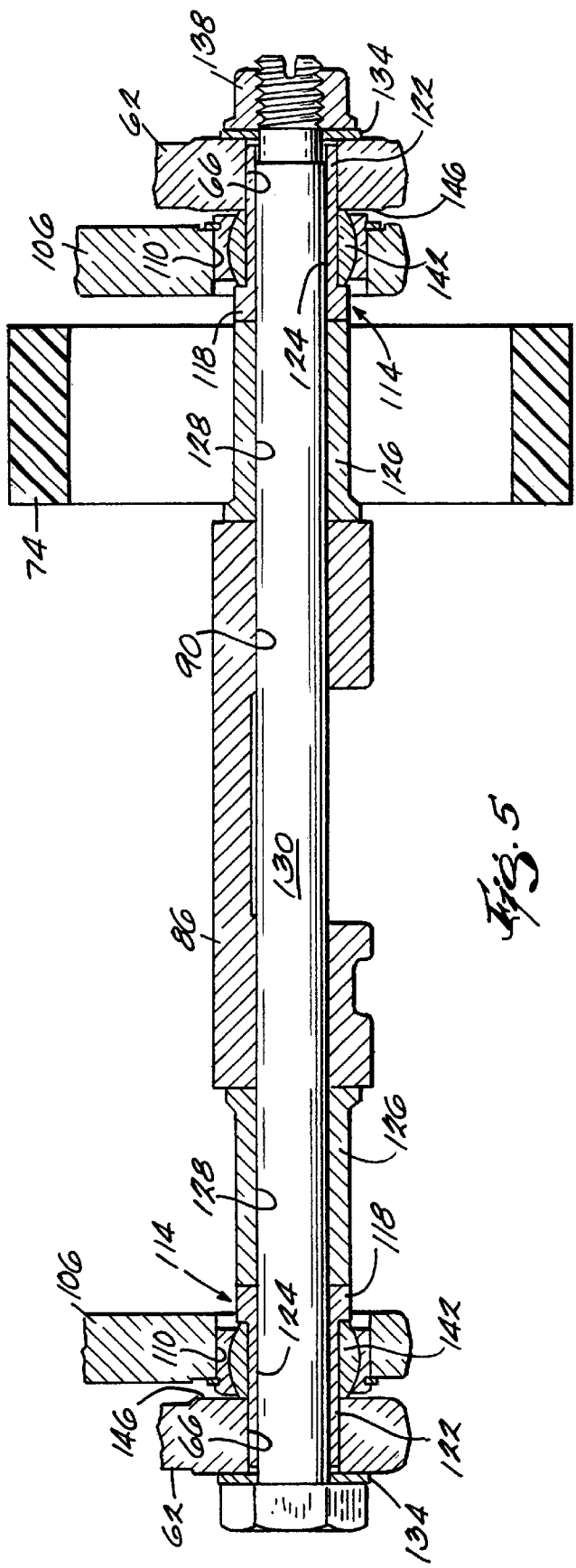
FIG. 5 is a cross-section view of the swing arm support assembly taken along line 5—5 in FIG. 4.

As shown in FIGS. 2 and 4, the top portion of the transmission case 38 is mounted to the backbone portion 42 of the frame 14 through an upper support 78 and fasteners. The bottom portion of the transmission case 38 is mounted to the frame 14 with suitable mounting assemblies 82. The rear of the transmission case 38 includes a transmission mounting portion 86 that has an elongated bore 90 extending therethrough (FIG. 5). The front of the transmission case 38 is mounted to the engine 34 along a substantially vertical interface with substantially horizontally-oriented bolts. Other types of engine-transmission interfaces may be used, such as a horizontal interface with substantially vertically-oriented bolts.

FIGS. 2 and 4 also illustrate the swing arm assembly, which includes a swing arm 94 and a pair of generally parallel shocks 98 pivotally mounted to the swing arm 94. The swing arm 94 includes rear wheel mounting portions 102 where the rear wheel is mounted for rotation. The swing arm 94 also includes a pair of swing arm mounting portions 106 that each have an elongated bore 110 extending through them (FIG. 5). The swing arm mounting portions 106 are adapted to be disposed on either side of, and in spaced relation to, the transmission mounting portion 86, and with the respective bores 110, 90 axially aligned.

A swing arm support assembly is best illustrated in FIGS. 2 and 5. The assembly includes a pair of bushings 114 having a flange portion 118, an elongated sleeve portion 122, and a bore 124 extending therethrough. The swing arm support assembly further includes a pair of spacer members 126 having bores 128, an elongated pivot member (e.g., a bolt 130), a pair of washers 134, and a nut 138. A bearing 142 is provided in each of the bores 110 of the swing arm mounting portions 106. The swing arm support assembly pivotally mounts the swing arm 94 adjacent to an inwardly-facing surface 146 of the pivot mounting portion 62, and supports the rear portion of the transmission case 38 in an operating position relative to the frame 14. The sleeve portions 122 of the bushings 114 extend through the bearings 142 in the swing arm mounting portions 106 and through the bores 66 in the pivot mounting portions 62 such that the flanges 118 abut the bearings 142 or an inner surface of the swing arm 94. The bolt 130 extends through the bores 66, 110, 124, 128, 90 in the pivot mounting portion 62 of the frame 14, the swing arm mounting portion 106, the bushings 114, the spacers 126, and the transmission mounting portion 86. The washers 134 are positioned as shown at either end of the bolt 130 against an outwardly-facing surface of the frame's pivot mounting portion 62, and the nut 138 is secured to hold the bolt 130 in place.

Figure 3:
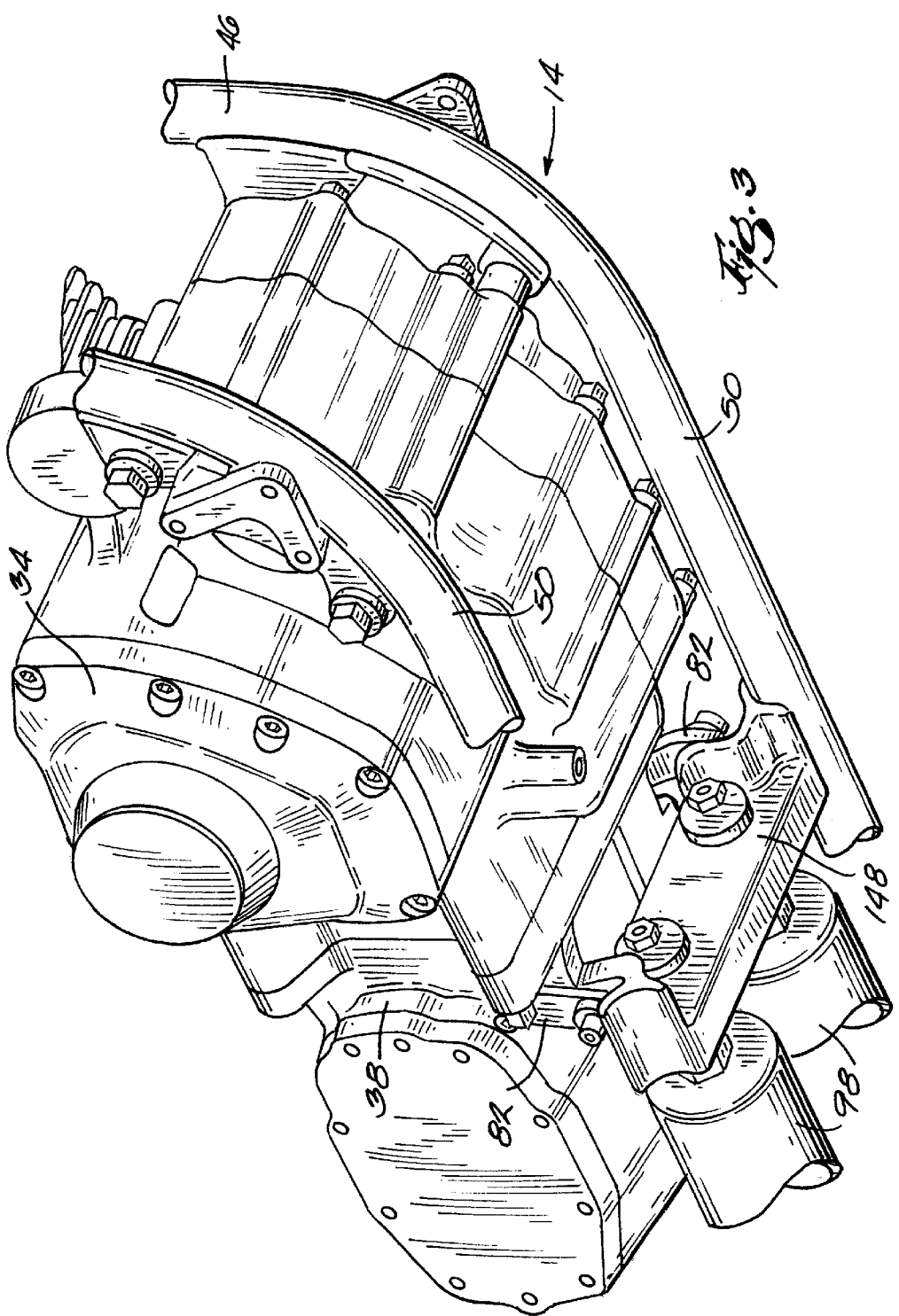
FIG. 3 is a perspective view of the bottom of a portion of the motorcycle with a portion of the frame removed for the purpose of illustration.

The shocks 98 have been omitted from FIG. 2 to better illustrate the frame 14 in that view. FIG. 3 illustrates the shocks 98 and how they are mounted to a cross-member 148 welded to the lower portions 50 of the frame. The shocks 98 absorb some of the vibrations and forces transmitted through the rear wheel assembly 30 swing arm 94.

The drive belt 74 defines a closed loop around the spacer 126 on the left side, as shown in FIGS. 1 and 5. When it is necessary to remove and replace the drive belt 74, the left side washer 134 and the nut 138 are removed from the bolt 130, and the bolt 130 is pulled out far enough to permit removal of the left side spacer 126. The drive belt 74 may then be removed and replaced while the bolt 130 supports the transmission case 38 in the operating position. Once the belt 74 has been replaced, the spacer bore 128 is aligned with the bolt 130, and the swing arm support assembly is returned to the condition illustrated in FIG. 5.

It should be noted that alternatives to the illustrated embodiment are contemplated. For example, the spacer 126 may be disposed other than on or around a portion of the bolt 130. The main purpose of the spacer 126 is to prevent or limit lateral movement of the transmission case 38, and to be removable to permit removal of the drive belt 74. In this regard, the spacer 126 may be positioned anywhere as long as it serves these purposes. For example, the spacer 126 may be disposed outside the loop, as long as it is removable to permit removal of the drive belt 74.

The illustrated swing arm support assembly facilitates assembly of the motorcycle 10. During assembly, the swing arm assembly (e.g., the swing arm 94 and shocks 98) is positioned adjacent the inwardly-facing surfaces 146 of the pivot mounting portion 62 of the frame 14, as shown in FIG. 2. Then the bushings 114 are inserted from the inside to temporarily couple the swing arm 94 and frame 14. Once the bushings 114 have been inserted, there is no further need to support the swing arm 94, because the bushings 114 hold the swing arm 94 in alignment with the frame 14. Then the transmission case 38 and spacers 126 are positioned in the operating position as shown in FIG. 2, and the bolt 130 is inserted and secured with the washers 134 and nut 138. At this point, the transmission case 38 is properly located with respect to the frame 14, and the upper and lower portions of the transmission case 38 may be mounted as shown in FIGS. 2 and 4. This method of assembling a motorcycle 10 does not require machining of the frame 14 or any support surface for the transmission case 38.

What is claimed is:

1. A method of assembling a motorcycle having a transmission case, a frame and a swing arm, said method comprising the steps of:

aligning a first mounting bore of the swing arm with a first mounting bore of the frame to create a first set of aligned mounting bores, and aligning a second mounting bore of the swing arm with a second mounting bore of the frame to create a second set of aligned mounting bores;

after aligning the mounting bores, inserting first and second bushings through the respective first and second sets of aligned mounting bores and maintaining the bushings within the mounting bores to interconnect the swing arm and the frame and to maintain such alignment of the mounting bores;

aligning a transmission mounting portion of the transmission case with the bushings while the bushings are within the mounting bores; and after aligning the bushings and transmission mounting portion, inserting a pivot member through the bushings and the transmission mounting portion to pivotally interconnect the swing arm, frame, and transmission.

2. The method of claimed 1, wherein the bushings include elongated portions, and wherein said inserting bushings step includes extending the elongated portions through the mounting bores of the swing arm and the frame.

3. The method of claim 1, wherein the frame includes inwardly-facing surfaces, and wherein said inserting bushings step includes positioning portions of the swing arm adjacent to the inwardly-facing surfaces of the frame and extending the bushings through the portions of the swing arm and then through the frame.

4. A method for removing a flexible drive member from a motorcycle comprising:

providing a motorcycle including a frame, an engine connected to the frame, a transmission case connected to the engine, the transmission case having an output shaft, a swing arm connected to the frame and the transmission case by an elongated member extending through said swing arm, said frame, and said transmission case, a rear wheel rotatably mounted to the swing arm, a flexible drive member defining a continuous unbroken loop inside of the frame and the swing arm, the flexible drive member coupling the rear wheel with the output shaft, and a spacer removably mounted on the elongated member between the swing arm and the transmission case;

at least partially removing the elongated member from the frame, the swing arm, the transmission case, and the spacer;

removing the spacer from between the swing arm and the transmission case to create a gap between the swing arm and the transmission case; and removing the flexible drive member as a continuous unbroken loop through the gap while maintaining the transmission case substantially in the operating position.

5. A method for assembling a motorcycle and removing a flexible drive member from the motorcycle, the method comprising:

providing a frame and an engine;

connecting the engine to the frame;

providing a transmission case having an output shaft;

connecting the transmission case to the engine;

providing a swing arm having a pair of extensions and a motorcycle wheel rotatably mounted to the swing arm between the extensions;

connecting the swing arm and the transmission case to the frame;

defining a gap between the swing arm and the transmission case;

providing a flexible drive member that defines a continuous and unbroken loop;

coupling the rear wheel and the output shaft with the flexible drive member;

positioning the flexible drive member between the swing arm extensions;

locating the gap within the continuous and unbroken loop;

providing a spacer;

providing an elongated member;

positioning the spacer in the gap between the swing arm and the transmission case and within the continuous unbroken loop defined by the flexible drive member;

inserting the elongated member through the spacer, the frame, the swing arm, and the transmission case;

least partially removing the elongated member from the spacer, the frame, the swing arm, and the transmission case;

removing the spacer from the gap between the swing arm and the transmission case; and removing the flexible drive member as a continuous unbroken loop through the gap while maintaining the transmission case substantially in the operating position.

* * * * *